US010464283B2

(12) United States Patent
Maier et al.

(10) Patent No.: US 10,464,283 B2
(45) Date of Patent: Nov. 5, 2019

(54) EMBOSSED AND HOT-MELT LAMINATED MULTILAYER COMPOSITE FILM

(71) Applicant: Profol Kunststoffe GmbH, Halfing (DE)

(72) Inventors: Konrad Maier, Wasserburg (DE); Helmut Bayer, Kienberg (DE); Josef Altenweger, Rosenheim (DE)

(73) Assignee: Profol Kunstsoffe GmbH, Halfing (DE)

( * ) Notice: Subject to any disclaimer, the term of this patent is extended or adjusted under 35 U.S.C. 154(b) by 0 days.

(21) Appl. No.: 15/500,458

(22) PCT Filed: Aug. 14, 2015

(86) PCT No.: PCT/EP2015/068770
§ 371 (c)(1),
(2) Date: Jan. 30, 2017

(87) PCT Pub. No.: WO2016/030215
PCT Pub. Date: Mar. 3, 2016

(65) Prior Publication Data
US 2017/0217121 A1  Aug. 3, 2017

(30) Foreign Application Priority Data

Aug. 25, 2014  (EP) .................................. 14182113
Aug. 26, 2014  (EP) .................................. 14182258

(51) Int. Cl.
*B29C 48/154*  (2019.01)
*B32B 27/32*  (2006.01)
(Continued)

(52) U.S. Cl.
CPC ............ *B32B 3/30* (2013.01); *B29C 48/0021* (2019.02); *B29C 48/08* (2019.02); *B29C 48/154* (2019.02);
(Continued)

(58) Field of Classification Search
CPC .. B32B 3/30; B32B 7/12; B32B 27/40; B32B 37/153; B32B 38/06; B29C 47/0021;
(Continued)

(56) References Cited

U.S. PATENT DOCUMENTS

2014/0147641 A1   5/2014   Vermeulen

FOREIGN PATENT DOCUMENTS

EP           1728624        12/2006
JP   1992-H04-062055 A      2/1992
(Continued)

OTHER PUBLICATIONS

PCT International Search Report and Written Opinion dated Sep. 25, 2015 (no translation of Written Opinion).
(Continued)

*Primary Examiner* — Catherine A. Simone
(74) *Attorney, Agent, or Firm* — McCarter & English, LLP

(57) ABSTRACT

A multi-layered composite film is provided that includes immediately consecutive and mutually bonded layers A-B-C:
  A: on the visible side, a polymer layer comprising 1 to 100% by weight of extrudable thermoplastic polyurethane-containing polymer and/or ionomer;
  B: a tie layer comprising one or more modified plastics for the tie;
  C: on the substrate side, a decorative layer;
wherein the layered composite is coextruded from the layers A and B and hot-melt laminated with the decorative substrate layer at a temperature above the fusion temperature of the layered composite, while simultaneously pattern(s) is/are plastically embossed on the visible side of the multi-layered composite film. The multi-layered composite films may be
(Continued)

used as a floor covering, wall panelling or furniture film. A method for manufacturing the multi-layered composite films is also provided.

22 Claims, 2 Drawing Sheets

(51) Int. Cl.
*B32B 27/34* (2006.01)
*B32B 27/36* (2006.01)
*B32B 27/40* (2006.01)
*B32B 38/06* (2006.01)
*B32B 37/15* (2006.01)
*B29C 48/00* (2019.01)
*B29C 48/08* (2019.01)
*B29C 48/21* (2019.01)
*B29C 48/92* (2019.01)
*B32B 25/04* (2006.01)
*B32B 27/08* (2006.01)
*B32B 27/10* (2006.01)
*B32B 27/20* (2006.01)
*B32B 27/30* (2006.01)
*B32B 3/30* (2006.01)
*B32B 7/12* (2006.01)
*B44C 1/24* (2006.01)
*B44F 9/02* (2006.01)
*B29K 75/00* (2006.01)
*B29K 711/12* (2006.01)
*B29L 31/44* (2006.01)
*B29L 31/00* (2006.01)

(52) U.S. Cl.
CPC .............. *B29C 48/21* (2019.02); *B29C 48/92* (2019.02); *B32B 7/12* (2013.01); *B32B 25/04* (2013.01); *B32B 27/08* (2013.01); *B32B 27/10* (2013.01); *B32B 27/20* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *B32B 27/40* (2013.01); *B32B 37/153* (2013.01); *B32B 38/06* (2013.01); *B44C 1/24* (2013.01); *B44F 9/02* (2013.01); *B29K 2075/00* (2013.01); *B29K 2711/12* (2013.01); *B29L 2031/44* (2013.01); *B29L 2031/732* (2013.01); *B32B 2255/10* (2013.01); *B32B 2255/12* (2013.01); *B32B 2255/26* (2013.01); *B32B 2270/00* (2013.01); *B32B 2307/412* (2013.01); *B32B 2307/51* (2013.01); *B32B 2307/72* (2013.01); *B32B 2307/75* (2013.01); *B32B 2309/02* (2013.01); *B32B 2309/105* (2013.01); *B32B 2309/12* (2013.01); *B32B 2451/00* (2013.01); *B32B 2471/00* (2013.01); *B32B 2479/00* (2013.01); *B32B 2607/00* (2013.01); *B32B 2607/02* (2013.01)

(58) Field of Classification Search
CPC ..... B29C 47/0064; B29C 47/065; B44F 9/02; B44C 1/24
See application file for complete search history.

(56) References Cited

FOREIGN PATENT DOCUMENTS

| | | |
|---|---|---|
| JP | 1996-H08-058050 A | 3/1996 |
| JP | 10230579 | 9/1998 |
| JP | 2004-002698 A | 1/2004 |
| JP | 2005-163314 A | 6/2005 |
| WO | 2009106500 | 9/2009 |
| WO | WO-2012001109 A1 * | 1/2012 ............ B32B 21/02 |
| WO | 20131501541 | 10/2013 |

OTHER PUBLICATIONS

Japanese Notice of Reason for Rejection dated Apr. 23, 2019 with English translation.

* cited by examiner

EMBOSSED AND HOT-MELT LAMINATED MULTILAYER COMPOSITE FILM

CROSS-REFERENCE TO RELATED APPLICATIONS

This application is a 35 U.S.C. § 371 National Stage filing of International Application No. PCT/EP2015/068770, filed on August, 2015, which claims priority to European Patent Application 14182113.2, filed on Aug. 25, 2014 and European Patent Application No. 14182258.5, filed on Aug. 26, 2014.

BACKGROUND OF THE INVENTION

(1) Field of the Invention

The invention relates to an embossed multi-layered composite film comprising a decorative substrate layer which, in addition to other applications, is particularly advantageously used as a floor covering, wall panelling or furniture film. The invention also relates to such floor coverings, wall panelling or furniture films and to a method for manufacturing the multi-layered composite films in accordance with the invention.

(2) Description of Related Art

Favourable manufacturing and material costs, ease of processing, chemical stability, high transparency, good wear resistance and high elasticity have in the past made polyvinyl chloride (PVC) the dominant synthetic base material for floor coverings, wall panelling and furniture films.

PVC films have for example found various applications in the manufacture of cheap furniture surfaces, wall panelling or floor coverings which imitate wood or stone surfaces, partly using wood and partly using layers of paper or film with a wood or stone design printed on them.

The advantages are countered by disadvantages such as the environmental impact of PVC and its properties when burned, which have spurred on the search for alternative materials as a substitute for PVC.

Many polymers such as polyolefins, polyamides, polyurethanes, polystyrene, polyesters and their copolymers and derivatives have been proposed as substitute materials; they are similarly cheap and easy to process, but have been inferior to PVC in terms of their mechanical properties and wear resistance. The visible sides of conventional floor coverings, wall panelling, furniture films and similar composites are often reinforced using layers of varnish or resin, for example melamine resin. This increases the cost of the composite films due to the higher raw material costs and processing costs and downgrades their life cycle assessment. Composite materials have also already been described which attempt to combine the advantages of cheap polyolefins as a substrate material with the superior mechanical properties of polar polymers. To date, these efforts encounter difficulties in ensuring a secure and durable interconnection between the layers, if possible without using adhesive, providing an efficient and continuous method for manufacturing the composite, and embodying the manufacturing method such that the appearance of the multi-layered film meets the highest aesthetic demands and can serve as a substitute for natural materials such as for example wood surfaces, stone surfaces or cork surfaces. WO 95/08593 A1 describes, as an alternative to PVC floor coverings, wear-resistant floor coverings which comprise a transparent covering layer made of ionomer, laminated onto a decorative layer via a layer of adhesive. DE 41 07 150 A1 describes a multi-layered floor covering film, wherein an upper film which contains plastic including polar groups is deposited onto a lower film via a bonding layer, bonding film, reactant layer or tie layer. DE 10 2012 103 016 A1 describes a film laminate composite comprising at least two plastic films, including a substrate film and a utility film, wherein the utility film is arranged on one side of the substrate film and can be printed on, the substrate film is a polyolefin film which is preferably pigmented, and the utility film consists of a thermoplastic polyurethane. These laminate composites are explicitly manufactured by adhesive lamination or heat lamination, avoiding decorative paper, and are recommended for use in the floor industry, furniture industry, interiors industry and/or exteriors industry. Embossments and associated problems are not mentioned in these documents.

Conventionally, embossments are made on the visible side of generic films, for example in order to imitate the surface of the natural materials mentioned, in a discontinuous process by hot-embossing or embossing the cooled films after they have been laminated onto a decorative layer which is printed on, or discontinuously or continuously before they are connected to the decorative layer, wherein a visible-side polymer layer, once it has been profile-extruded, is cooled down to about 140° C., spread with adhesive and provided with a rear-side decorative layer. The embossing pattern is then embossed on. This method has the disadvantage on the one hand that a relaxation of the embossed plastic leaves the embossing depth on the visible side lower than is predetermined by the embossing die and that the embossed image is adversely affected by trapped air, while on the other hand, a raised embossment is made on the substrate side—the side facing away from the visible side. This makes it more difficult to apply adhesive on the substrate side and/or increases the amount of adhesive needed to establish a satisfactory connection to the substrate.

WO 2012/001109 A1 describes a method for manufacturing floor elements in which a decorative layer is initially applied to a polymeric composite layer, generally a wood-plastic composite (WPC) layer, without adhesive by means of hot-melt laminating, and the decorative layer, once printed on, is successively coated with a tie layer and an ionomer layer, as applicable, wherein the method can be rounded off with a subsequent embossment. In accordance with WO 2012/001109 A1, it is alternatively also possible to prefabricate a layered composite consisting of an ionomer layer and a polymer layer and to continuously or discontinuously emboss it as it is laminated onto a substrate such as WPC. These methods also raise questions about the optimum ratio of embossment and raised embossment and about continuously conducting the method in a way which is economical and avoids a second or subsequent heating cycles and is suitable for providing multi-layered composite films which can be universally employed.

The problem of providing a multi-layered composite film which exhibits very good bonding between the respective layers and contains substantially no harmful substances, in particular no vinyl chloride monomers, and only requires a minimum of adhesive and solvent or ideally does not contain adhesive or solvent, has not yet been satisfactorily solved. Another object of the invention is to additionally minimise the problem of raised embossment.

BRIEF SUMMARY OF THE INVENTION

The present invention solves several and up to all of the problems mentioned and combines, for the first time, the aesthetic advantages of natural materials, the ecological and non-toxicity advantages of PVC-substitute polymers, and the economic, processing and mechanical advantages of PVC films. In accordance with the invention, the object is solved by a multi-layered composite film comprising at least the following immediately consecutive and mutually bonded layers A-B-C:

A: on the visible side, a polymer layer comprising 1 to 100% by weight, preferably 10 to 90% by weight, of extrudable thermoplastic polyurethane-containing polymer and/or ionomer;

B: a tie layer comprising one or more modified plastic(s) for the tie;

C: on the substrate side, a decorative layer;

characterised in that the layered composite of the layers A and B is coextruded and hot-melt laminated with the decorative substrate layer at a temperature above the fusion temperature of the layered composite, while simultaneously one or more patterns is/are plastically embossed on the visible side of the multi-layered composite film in the same step. The visible-side polymer layer advantageously comprises 1 to 100% by weight, in particular 10 to 90% by weight and most particularly 50 to 80% by weight, of extrudable polyurethane-containing polymer. Pure polyurethane-containing polymer (96 to 100% by weight) or also mixtures with other extrudable polymers are advantageous.

Alternatively or additionally, the visible-side polymer layer can advantageously comprise 1 to 100% by weight, in particular 10 to 90% by weight and most particularly 50 to 80% by weight, of extrudable thermoplastic ionomer. Pure polyurethane-containing polymer (96 to 100% by weight) or also mixtures with other extrudable polymers are advantageous. Ionomer blends, for example blends of ionomer(s) with polyamide(s), or ionomers which exhibit a density (DIN EN ISO 1183-1:2013-04) in the range of 0.8 to 1.2 g/cm$^3$, in particular 0.9 to 1.0 g/cm$^3$, most particularly about 0.94 to 0.96 g/cm$^3$, are particularly advantageous. Ionomers which exhibit a melt flow index (MFI) at 190° C. and 2.16 kg (in accordance with DIN EN ISO 1183-1:2013-04) in the range of 0.4 to 7.0 g/10 min, in particular 0.5 to 5.7 g/10 min, most particularly advantageously 0.6 to 0.9 g/10 min or also 5.3 to 5.6 g/10 min, are preferred. The melting point (DIN EN ISO 3146:2002-06) of the ionomer used is advantageously in the range of 85 to 98° C., in particular 88 to 97° C. and most particularly advantageously 89 to 92° C., or also 94 to 96° C. The vicat softening point (DIN EN ISO 306:2012-01) of the ionomer used is advantageously in the range of 60 to 70° C., in particular 62 to 68° C. and most particularly advantageously around 65° C.

Advantageously in accordance with the invention, the modified plastic(s) for the tie can preferably comprise one or more polymer(s) modified with maleic anhydride, alkylated maleic anhydride and/or carboxylic acid.

The tie layer B can then represent a homogenous layer. Alternatively, it can comprise several, for example two, three or more layers which respectively contain the same or different members of the aforementioned modified plastics for the tie. In some embodiments, improved bonding between the layers A and C is achieved by a succession of different modified plastics for the tie.

BRIEF DESCRIPTION OF DRAWINGS

To assist those of ordinary skill in the art in making and using the disclosed assemblies, systems and methods, reference is made to the appended figures, wherein.

DETAILED DESCRIPTION OF DISCLOSURE

Figure 1:
FIG. 1 shows a cross-section of an embodiment of the multi-layered composite film of the invention which exhibits the layer design A-B-C.

The layered composite consisting of the layers A and B is coextruded at temperatures at which the polymers are fused. It is preferably coextruded at temperatures in the range of 100 to 400° C., particularly preferably in the range of 200 to 300° C. The following step of embossing and hot-melt laminating is performed as long as the coextruded layered composite is above the fusion temperature. Embossing and hot-melt laminating can typically be performed at temperatures above 200° C., in particular above 230° C., for example at at least 250° C., but advantageously below 280° C. or 260° C. Embossing and hot-melt laminating are advantageously performed in the same machine, temporally and spatially immediately following coextrusion.

One advantage of the invention is that the layered composite A-B-C can be made largely without any solvent and/or adhesive. Ideally, the composite A-B-C does not contain any organic solvents and/or adhesives.

Because embossing and hot-melt laminating are simultaneous, a realistic embossing depth can be achieved on the visible side of the multi-layered composite film, while the problem of "raised embossment" on the substrate side can be avoided completely or as far as possible. Since the coextruded layered composite A-B has not yet cooled and the embossment is to all intents and purposes made in the molten mass, there is no perceptible or only minimal relaxation after embossing. In accordance with the invention, it is surprisingly possible to avoid "raised embossment" as far as possible and to simultaneously achieve a high degree of wear resistance and low staining.

The method is moreover highly economic, since an additional heating cycle for laminating is not required. The method in accordance with the invention also enables a reliable connection between the substrate, the decorative layer and the visible-side polymer layer containing thermoplastic polyurethane-containing polymer and/or ionomer. Laminating the soft material of the visible-side polymer layer, by contrast, involves great difficulties.

The dimensionless embossing depth index $I_P$ represents one measure of "raised embossment". It is calculated from the ratio of the embossing depth on the visible side to the raised embossment on the substrate side, each measured as an average surface roughness $R_Z$ (DIN EN ISO 4287:2010-07) divided by the thickness of the layered composite A-B-C, multiplied by 1000, all values being in micrometers:

$$I_P = R_Z(\text{visible side}) \times 1000/(R_Z(\text{substrate side}) \times \text{thickness}(A\text{-}B\text{-}C)).$$

An embossing depth index of at least 6.0 after cooling is preferably achieved in accordance with the invention. For some applications, an embossing depth index of at least 8.0 or at least 9.5 or 10 to 20, preferably at least 13 or even more advantageously at least 14 or at least 16 can be achieved. Embossing depth indices of up to 30 or higher can be achieved in accordance with the invention.

One advantage of a large embossing depth index is that the visible side can be embodied to be warm, soft, impact sound-absorbing and plastic and for example realistically imitates the tactile sensation and optical/aesthetic impression of coarse wood and coarse natural stone, while the surface of the layer on the substrate side can be kept as smooth and even as possible. This facilitates connecting it to a substrate E. The amount of adhesive required to connect it to a substrate E is for example minimised. The present invention additionally provides, for the first time, structural films which have no layer(s) of varnish or resin for additional visible-side protection but are nonetheless suitable for meeting the demands of wear resistance, chemical stability, scratch resistance, low staining, high durability and good resilience. The multi-layered composite film in accordance with the invention advantageously contains no PVC and/or melamine resin.

In accordance with the invention, the decorative layer can comprise paper and/or plastic film which is printed on, wherein the plastic film can be monoaxially or biaxially orientated. Printing on film can be particularly preferable in accordance with the invention due to the increased brilliance. Casein-based printing inks (casein inks) are particularly preferred in accordance with the invention. The decorative pattern can be colourless, white, plain-coloured or coloured in some other way.

In some cases, it can be expedient to apply a primer to the decorative layer, for example via a calender. This can improve the interconnection with the layered composite A-B, for example when casein printing inks are preferably used. The invention similarly relates to layered composites in accordance with the invention in which substrate-side decorative layer does not comprise a primer.

The patterns embossed on in accordance with the invention are in principle unrestricted in terms of their embossing depth and design, although the maximum embossing depth is predetermined by the thickness of the layer, wherein the designs can be imitations of natural materials such as wood, stone, textiles, a stucco structure or any pattern which can be represented on a continuous roller. In accordance with the invention, the pattern embossed on can particularly advantageously be synchronised with the printed pattern, such that for example in the case of a wood imitation, the tactile sensation of the texture matches the optical impression. Embodying the respective pattern as a continuous and uninterrupted repetition further reinforces the true-to-nature impression.

The polymer of the polymer layer A of the multi-layered composite film of the present invention can advantageously be selected from thermoplastic polyurethane or ionomer, for example Surlyn® ionomer, or mixtures of the same, wherein it is advantageous if the polymer of the visible-side polymer layer A, for example an ionomer, is transparent and/or clear. The decorative pattern is preferably visible through the layers A and B.

The modified plastic(s) for the tie can advantageously comprise one or more copolymer(s) or grafted (co)polymers of monomers which support carboxylic acid functionality, in particular maleic anhydride and/or alkylated maleic anhydride with polypropylene, polyethylene (for example LDPE or LLDPE), ethylene-vinyl acetate (EVA), ethylene-butyl acrylate (EBA), ethylene-ethyl acrylate (EEA), ethylene-acrylic acid (EAA), ethylene-methacrylic acid (EMAA), maleic acetate (MAH) and/or polyacrylate rubber (ACM).

In one embodiment of the invention, the decorative layer C contains an extrudable thermoplastic polymer selected from the group consisting of polyethylenes, polypropylenes and polybutylenes, polystyrene, polyamide, polyester such as polyethylene terephthalate (PET) and mixtures of the same. One advantage of such decorative layers containing plastic film is their good printability, good process capability, their water resistance and their chemical stability.

The polymer layer A typically, though not necessarily, exhibits a thickness in the range of 1 to 500 µm, preferably 5 to 200 µm; and/or
the tie layer B typically, though not necessarily, exhibits a thickness in the range of 1 to 100 µm, preferably 5 to 20 µm, in particular 6 to 10 µm; and/or
the substrate layer C typically, though not necessarily, exhibits a thickness of 1 to 500 µm, preferably 10 to 150 µm.

The multi-layered composite film of the present invention is also advantageously embodied such that it comprises at least the consecutive and mutually bonded layers D-A-B-C, wherein the layer D denotes one or more mutually bonded layers and is connected to the layer A directly, via a bonding layer or adhesive layer, by lamination or by mechanical connecting elements, wherein the layer D can for example have a thickness of 1 to 200 µm, advantageously 10 to 100 µm.

The layer D can then advantageously comprise one or more of the following layers: one or more additional ionomer layers, a covering layer, a UV protection layer, a layer of varnish, a moisture protection layer, a mechanical protection layer, a layer which prevents slipping, or a (heat-melt) adhesive layer; wherein the layer D can be transparent and/or can comprise a surface profile.

On the substrate side, the layer C can in accordance with the invention advantageously adjoin a substrate layer E which is connected to the layer C directly, via a bonding layer or adhesive layer, by lamination or by mechanical connecting elements.

The layers A, B, C, D and E can in accordance with the invention contain no filler materials, effect materials and/or pigments. Conversely, in another embodiment of the invention, one or more of these layers—for example, the layers D and/or E, or the layers D and/or A—comprise filler materials, effect materials and/or pigments in an amount of 1 to 100% by weight. In one embodiment, the layered composite A-B-C or in particular the layer C contains no inorganic filler materials, effect materials and/or organic or inorganic pigments. In another embodiment, it is precisely the presence of such pigments or filler materials in one or more of the layers A-B-C which can provide for particular effects.

The multi-layered composite film in accordance with the present invention can for example and ideally be used as a floor covering or in the manufacture of a floor covering, as wall panels or roof panels or in the manufacture of wall panels or roof panels, as furniture film, in particular in the manufacture of plywood board or chipboard and/or as a graphic film, in particular a printed film.

The invention also therefore relates to a floor covering, wall panels and roof panels, a furniture film, plywood and chipboard and graphic film, in particular printed film, comprising a multi-layered composite film in accordance with the invention.

A floor covering in accordance with the invention advantageously then comprises another layer E which is a substrate layer which adjoins the layer C and is connected to the layer C directly, via a bonding layer or adhesive layer, by lamination or by mechanical connecting elements, wherein the substrate layer E preferably comprises one of the following layers: a layer which prevents slipping, a heat-insulating layer, a sound-absorbing and in particular impact sound-absorbing layer, a heat-conducting layer, an adhesive layer, a plywood layer or chipboard layer, a wood-plastic composite (WPC) layer and a fibre-reinforced concrete layer.

As described above, the invention similarly relates to a method for manufacturing a multi-layered composite film in accordance with the invention, characterised in that the layered composite of the layers A and B is coextruded in a first step and hot-melt laminated with the decorative substrate layer at a temperature above the fusion temperature of the layered composite in a second step, while simultaneously one or more patterns is/are plastically embossed on the visible side of the multi-layered composite film in the same step, wherein the temperature of the layered composite does not drop below the fusion temperature of the layered composite A-B between the first and second method steps.

The second method step is then advantageously performed at a temperature of 150 to 300° C. As already stated, the method in accordance with the invention is preferably performed continuously. The embossment on the visible side is preferably synchronised with the decorative pattern printed on the decorative layer.

Coextrusion is then performed in a conventional way under conditions which will be familiar to the person skilled in the art. The particular properties of the multi-layered composite films in accordance with the invention are achieved by performing the method steps of hot-melt laminating and embossing, which are known in their own right, simultaneously and without an additional heating cycle, in a continuous operation.

FIG. 1 shows a cross-section of an embodiment of the multi-layered composite film of the invention which exhibits the layer design A-B-C. In this example, the layers are composed of:
Layer A (100 µm) ionomer;
Layer B (8 µm) maleic-anhydride-modified polyethylene as a modified plastic for the tie;
Layer C (120 µm) paper or plastic film which is printed on using casein ink and coated (10 µm) with primer.

Figure 2:
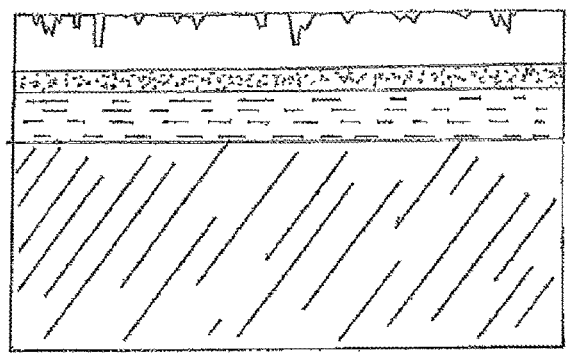
FIG. 2 shows a cross-section of another embodiment of the multi-layered composite film, for example as a floor covering which exhibits the layer design A-B-C-E.

FIG. 2 shows a cross-section of another embodiment of the multi-layered composite film, for example as a floor covering which exhibits the layer design A-B-C-E. In this example, the layers are composed of:
Layer A (100 µm) ionomer;
Layer B (8 µm) maleic-anhydride-modified polyethylene as a modified plastic for the tie;
Layer C (120 µm) paper or plastic film which is printed on using casein ink and coated (10 µm) with primer;
Layer E (2000 µm) WPC.

Figure 3:
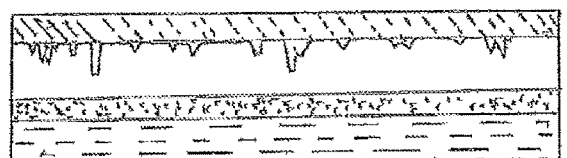
FIG. 3 shows a cross-section of another embodiment of the multi-layered composite film, for example as a furniture film which exhibits the layer design D-A-B-C.

FIG. 3 shows a cross-section of another embodiment of the multi-layered composite film, for example as a furniture film which exhibits the layer design D-A-B-C. In this example, the layers are composed of:
Layer D (50 µm) varnish;
Layer A (110 µm) thermoplastic polyurethane;
Layer B (5 µm) maleic-anhydride-modified polyethylene as a modified plastic for the tie;
Layer C (100 µm) PET which is printed on using casein ink and coated (10 µm) with primer.

Figure 4:
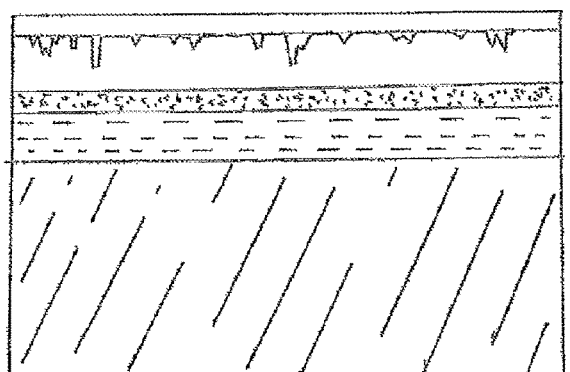
FIG. 4 shows a cross-section of another embodiment of the multi-layered composite film, for example as a furniture film which exhibits the layer design D-A-B-C-E.

FIG. 4 shows a cross-section of another embodiment of the multi-layered composite film, for example as a furniture film which exhibits the layer design D-A-B-C-E. In this example, the layers are composed of:

Layer D (80 µm) ionomer;
Layer A (120 µm) ionomer;
Layer B (10 µm) maleic-anhydride-modified polyethylene as a modified plastic for the tie;
Layer C (90 µm) paper which is printed on using casein ink and coated (10 µm) with primer;
Layer E (1500 µm) plywood layer, wood or for example fibre-reinforced concrete.

Figure 5:
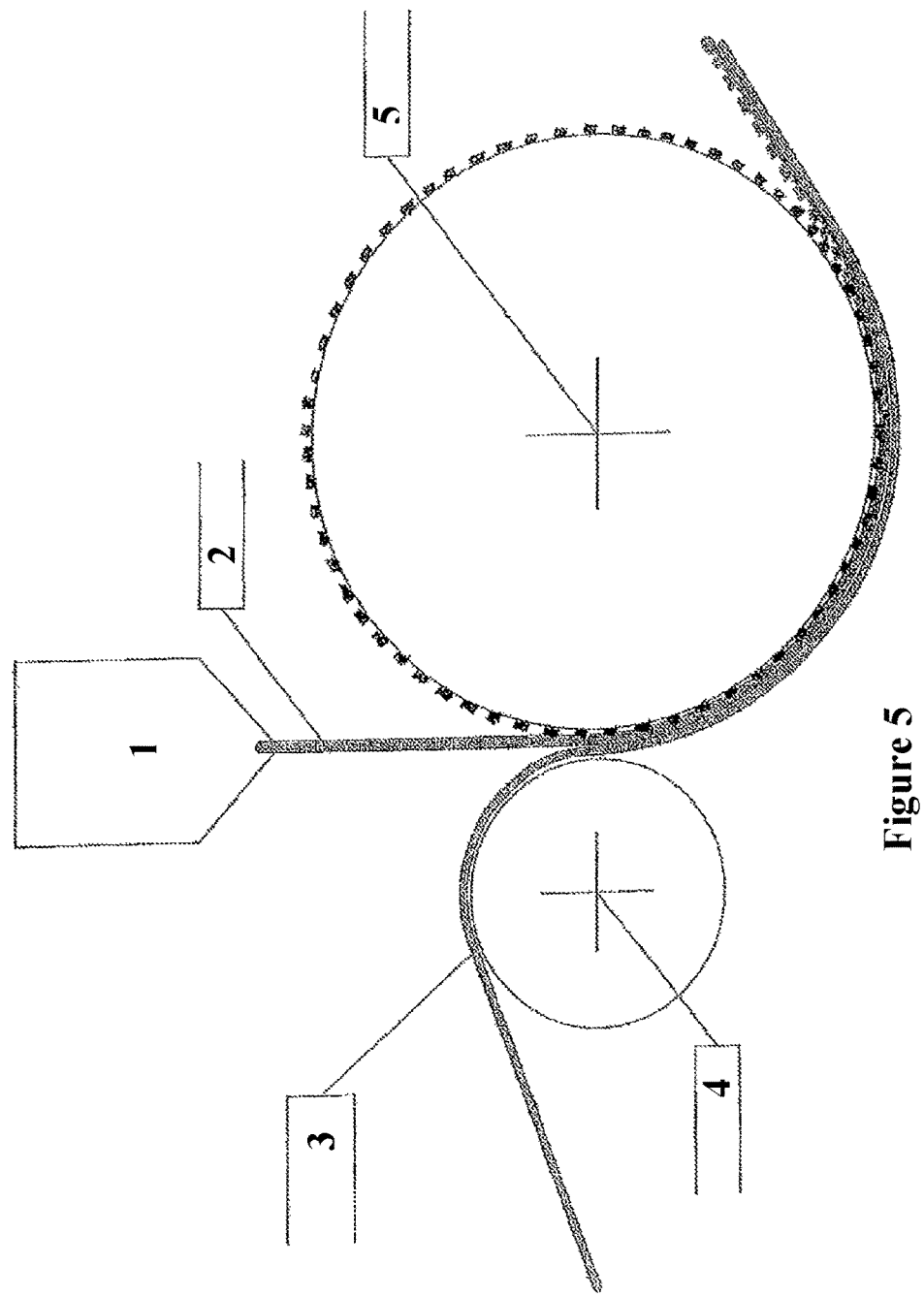
FIG. 5 shows a schematic and typical design of the method in accordance with the invention.

FIG. 5 shows a schematic and typical design of the method in accordance with the invention, wherein a composite made of a layer A, which consists for example of ionomer, is coextruded in the nozzle 1 at a temperature of 200 to 280° C. with a (substrate-side) tie layer B as a molten mass 2 and then immediately connected on the substrate side, at the same temperature, to a layer of paper C/3 which is printed on and which is fed via a roller 4, for example a rubber roller. The layer C and the layered composite A-B are hot-melt laminated and simultaneously embossed on the visible side between the embossing roller 5 and the roller 4 at temperatures in the range of for example 150 to 300° C. simultaneously or immediately after they have been converged.

EXAMPLES

Example 1

A multi-layered composite film exhibiting the following sequence of layers was manufactured according to the method in accordance with the invention, wherein the layers A and B were coextruded at 250° C. and then immediately hot-melt laminated with the layer of film C (which has a wood grain pattern printed on it in casein ink and is provided with primer) while still at 230° C. and at a pressing force of 30 kN, wherein a plastic wood-texture pattern was embossed on the visible side.
Layer A (300 µm) ionomer (Surlyn® 1706 by Dupont);
Layer B (10 µm) maleic-anhydride-modified polyethylene as a modified plastic for the tie;
Layer C (120 µm) polypropylene film which is printed on using casein ink and coated (10 µm) with primer.

Table 1 lists some parameters for characterising the multi-layered composite film of Example 1.

TABLE 1

| | |
|---|---|
| Overall thickness A-B-C | 431 µm |
| Embossing depth index $I_P$ (averaged from two measurement values, dimensionless) | 14.1 |
| Density | 0.973 g/cm$^3$ |
| Grammage | 4.189 g/100 cm$^2$ |
| Young's modulus, longitudinal | 458 Mpa |
| Young's modulus, transverse | 406 Mpa |
| Maximum force, longitudinal | 177 N (6.47 SO mm$^2$) |
| Maximum force, transverse | 159 N (6.47 SO mm$^2$) |
| Maximum elongation, longitudinal | 246% |
| Maximum elongation, transverse | 201% |
| Elongation at rupture, longitudinal | 246% |
| Elongation at rupture, transverse | 201% |
| Tensile strength, longitudinal | 27 Mpa |
| Tensile strength, transverse | 25 Mpa |
| Tearing strength, longitudinal | 27 Mpa |
| Tearing strength, transverse | 25 Mpa |
| Breaking force, longitudinal | 175 N |
| Breaking force, transverse | 159 N |

(DIN EN ISO 527-3/1B/200) The average surface roughness $R_Z$ was determined using the MAHR perfometer.

Example 2

A multi-layered composite film exhibiting each of the following sequences of layers was manufactured according to the method in accordance with the invention, wherein the layers A and B were coextruded at 250° C. and then immediately hot-melt laminated with a layer of paper C (which has a wood grain pattern printed on it in casein ink and is provided with 15 μm of primer) while still at 230° C. and at a pressing force of 30 kN, wherein a plastic wood-texture pattern was embossed on the visible side.

Film 2a
Layer A (50 μm) ionomer (Surlyn® 1706 by Dupont de Nemours);
Layer B (10 μm) maleic-anhydride-modified polyethylene as a modified plastic for the tie;
Layer C (105 μm) decorative paper which is printed on using casein ink and coated (15 μm) with primer.
Overall thickness A-B-C: 165 μm Film 2b
Layer A (250 μm) ionomer (Surlyn® 1706 by Dupont de Nemours);
Layer B (10 μm) maleic-anhydride-modified polyethylene as a modified plastic for the tie;
Layer C (105 μm) decorative paper which is printed on using casein ink and coated (15 μm) with primer.
Overall thickness A-B-C: 365 μm The layered composite films were laminated with chipboard/hot-melt adhesion and tested for scratch resistance (DIN 438-2), abrasion resistance, wear resistance (DIN EN 13329) and resistance to staining (DIN 438-2), wherein the layered composites in accordance with the invention exhibit good to very good results throughout.

The invention claimed is:

1. A multi-layered composite film, comprising at least the following immediately consecutive and mutually bonded layers A-B-C:
A: on a visible side, a polymer layer comprising 1 to 100% by weight of extrudable thermoplastic polyurethane-containing polymer and/or ionomer;
B: a tie layer comprising one or more modified plastics for the tie;
C: on a substrate side, a decorative layer;
characterised in that the layered composite of the layers A and B is coextruded and hot-melt laminated with the decorative layer at a temperature above the fusion temperature of the layered composite, while simultaneously one or more patterns is/are plastically embossed on the visible side of the multi-layered composite film in the same step; and
characterised in that an embossing depth index $I_P$ is at least 6.0 once the multi-layered composite film has cooled to room temperature, and the embossing depth index $I_P$ is dimensionless and defined as follows (all values being in micrometers):

$$I_P = R_Z(\text{visible side}) \times 1000 / (R_Z(\text{substrate side}) \times \text{thickness}(A\text{-}B\text{-}C)).$$

2. The multi-layered composite film according to claim 1, characterised in that the decorative layer comprises paper, plastic film or a combination of paper and plastic film which is printed on.

3. The multi-layered composite film according to claim 2, characterised in that the decorative layer C comprises a primer.

4. The multi-layered composite film according to claim 1, characterised in that the one or more embossed patterns is synchronized with the decorative layer.

5. The multi-layered composite film according to claim 1, characterised in that it contains no PVC or melamine resin.

6. The multi-layered composite film according to claim 1, characterised in that the polymer of the polymer layer A is an ionomer.

7. The multi-layered composite film according to claim 1, wherein the modified plastic(s) for the tie comprise(s) one or more polymer(s) modified with maleic anhydride, alkylated maleic anhydride and/or carboxylic acid.

8. The multi-layered composite film according to claim 1, characterised in that the decorative layer C contains an extrudable thermoplastic polymer selected from the group consisting of polyethylenes, polypropylenes and polybutylenes, polystyrene, polyamide, polyester and mixtures of the same.

9. The multi-layered composite film according to claim 1, characterised in that the polymer layer A exhibits a thickness in the range of 1 to 500; and/or the tie layer B exhibits a thickness in the range of 1 to 100 μm; and/or the decorative layer C exhibits a thickness of 1 to 500 μm.

10. The multi-layered composite film according to claim 1, characterised in that it comprises at least the consecutive and mutually bonded layers D-A-B-C, wherein the layer D denotes one or more mutually bonded layers and is connected to the layer A directly, via a bonding layer or adhesive layer, by lamination or by mechanical connecting elements.

11. The multi-layered composite film according to claim 10, characterised in that the layer D comprises one or more of the following layers: a covering layer, a UV protection layer, a moisture protection layer, a mechanical protection layer, a layer which prevents slipping, or a (heat-melt) adhesive layer, wherein the layer D can be transparent and/or can comprise a surface profile.

12. The use of a multi-layered composite film in accordance with claim 1, wherein the multi-layered composite film is used as a floor covering or in the manufacture of a floor covering, as wall panels or roof panels or in the manufacture of wall panels or roof panels, as furniture film.

13. A layered body comprising a multi-layered composite film in accordance with claim 1, wherein the multi-layered composite film is used as a floor covering or furniture film.

14. The floor covering according to claim 13, characterised in that it comprises at least one other layer E which is a substrate layer which adjoins the layer C and is connected to the layer C directly, via a bonding layer or adhesive layer, by lamination or by mechanical connecting elements.

15. The floor covering according to claim 14, characterised in that the substrate layer E comprises one of the following layers: a layer which prevents slipping, a heat-insulating layer, an impact sound-absorbing layer, a heat-conducting layer, an adhesive layer, a plywood layer or chipboard layer, a wood-plastic composite (WPC) layer and a fibre-reinforced concrete layer.

16. A method for manufacturing a multi-layered composite film according to claim 1, characterised in that the layered composite is coextruded from the layers A and B in a first step and hot-melt laminated with the decorative layer at a temperature above the fusion temperature of the layered composite in a second step, while simultaneously one or more patterns is/are plastically embossed on the visible side of the multi-layered composite film in the same step, wherein the temperature of the layered composite does not drop below the fusion temperature of the layered composite A-B between the first and second method steps.

17. The method according to claim 16, characterised in that the second method step is performed at a temperature of 150 to 300° C.

18. The multi-layered composite film according to claim 7, wherein the modified plastic(s) for the tie comprise(s) one or more copolymer(s) or grafted (co)polymers of monomers which support carboxylic acid functionality.

19. The multi-layered composite film according to claim 18, wherein the modified plastic(s) for the tie comprise(s) maleic anhydride and/or alkylated maleic anhydride with polypropylene, polyethylene, ethylene-vinyl acetate (EVA), ethylene-butyl acrylate (EBA), ethylene-acrylic acid (EAA), ethylene-methacrylic acid (EMAA), maleic acetate (MAH) and/or polyacrylate rubber (ACM).

20. The multi-layered composite film according to claim 9, characterised in that the polymer layer A exhibits a thickness in the range of 5 to 200 µm; and/or the tie layer B exhibits a thickness in the range of 5 to 20 µm; and/or the decorative layer C exhibits a thickness of 10 to 150 µm.

21. The multi-layered composite film according to claim 20, wherein the tie layer B exhibits a thickness in the range of 6 to 10 µm.

22. The use of a multi-layered composite film in accordance with claim 12, wherein the multi-layered composite film is used in the manufacture of a plywood board or chipboard and/or as a graphic film, or a printed graphic film.

* * * * *